United States Patent [19]

Hauser

[11] Patent Number: 4,689,859
[45] Date of Patent: Sep. 1, 1987

[54] HOOK WITH SAFETY LATCH

[75] Inventor: Thomas A. Hauser, Rockford, Ill.

[73] Assignee: The Caldwell Co., Inc., Rockford, Ill.

[21] Appl. No.: 797,454

[22] Filed: Nov. 13, 1985

[51] Int. Cl.⁴ .............................................. A44B 13/02
[52] U.S. Cl. ...................................... 24/233; 24/234; 24/235; 24/239
[58] Field of Search ................... 24/233, 241 S, 241 P, 24/241 PS, 234, 235, 237, 238, 239, 579, 599, 231, 230.5 R

[56] References Cited

U.S. PATENT DOCUMENTS

| | | | |
|---|---|---|---|
| 271,372 | 1/1883 | Sheridan | 24/233 |
| 1,709,235 | 10/1986 | Shaffer | 24/234 X |
| 1,724,003 | 8/1929 | Chamberlain | 24/233 |
| 1,877,702 | 9/1932 | St. Clair | 24/233 |
| 2,826,798 | 3/1958 | Kahl et al. | 24/238 |
| 3,105,280 | 10/1963 | Davis | 24/234 |
| 3,194,598 | 7/1965 | Goldfuss | 24/235 X |
| 3,317,972 | 5/1967 | Harley | 24/239 X |
| 3,501,817 | 3/1970 | Bambenek et al. | 24/233 X |
| 3,548,909 | 12/1970 | Sander | 24/230.5 R X |

FOREIGN PATENT DOCUMENTS

| | | | |
|---|---|---|---|
| 532971 | 2/1922 | France | 24/233 |
| 43066 | 11/1933 | France | 24/235 |
| 677224 | 8/1952 | United Kingdom | 24/238 |

Primary Examiner—Peter A. Aschenbrenner
Assistant Examiner—Laurie K. Cranmer
Attorney, Agent, or Firm—Leydig, Voit & Mayer

[57] ABSTRACT

A generally U-shaped grab hook with an eye on one leg includes a safety latch which is pivotally mounted on the free end portion of the other leg to swing between latched and unlatched positions. When in its latched position, the latch retains a sling chain or the like in the throat of the hook and, because of the location of the pivot, any load placed on the latch by the chain tends to force the latch more tightly into its latched position. Spring-loaded detent balls are carried by the hook and coact with holes in the latch to hold the latch releasably in either of its positions and to require the latch to be positively pivoted from one position to the other.

3 Claims, 6 Drawing Figures

U.S. Patent  Sep. 1, 1987  4,689,859
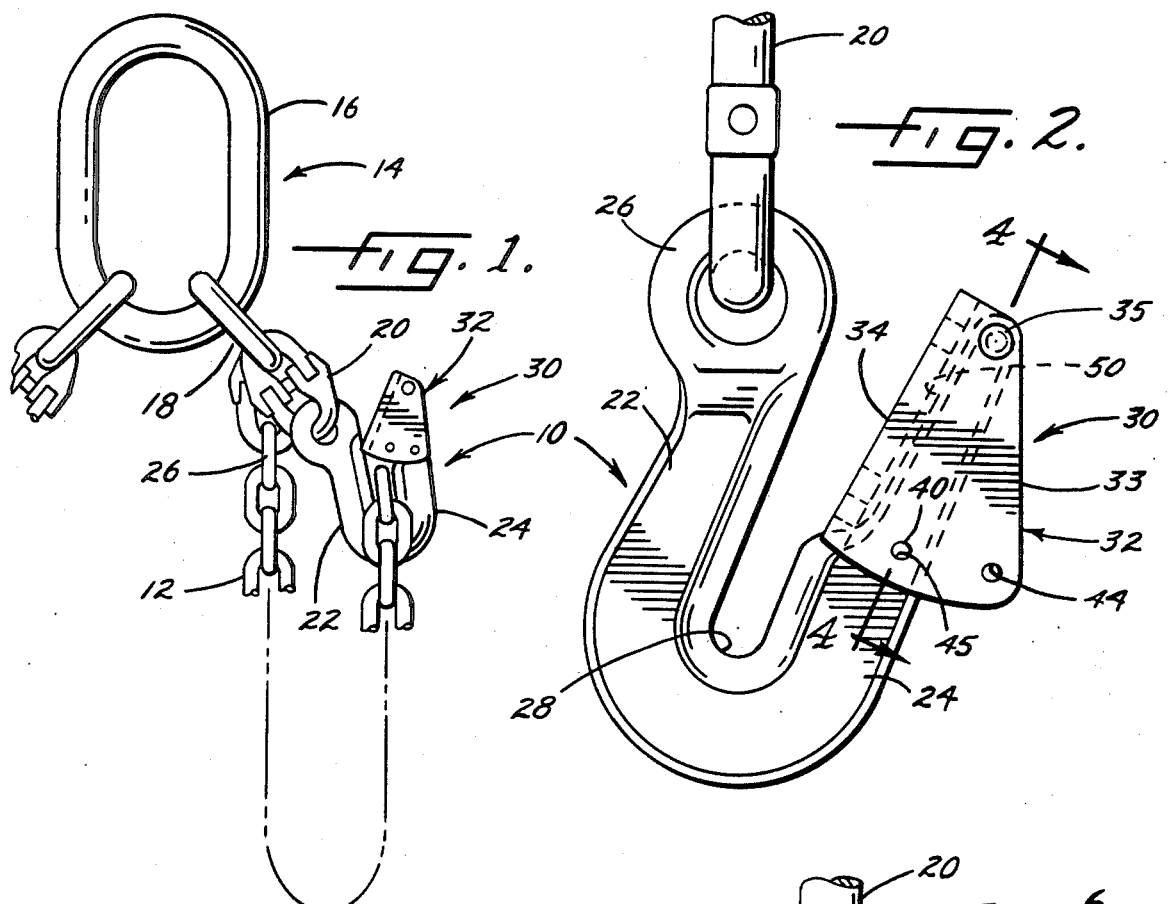
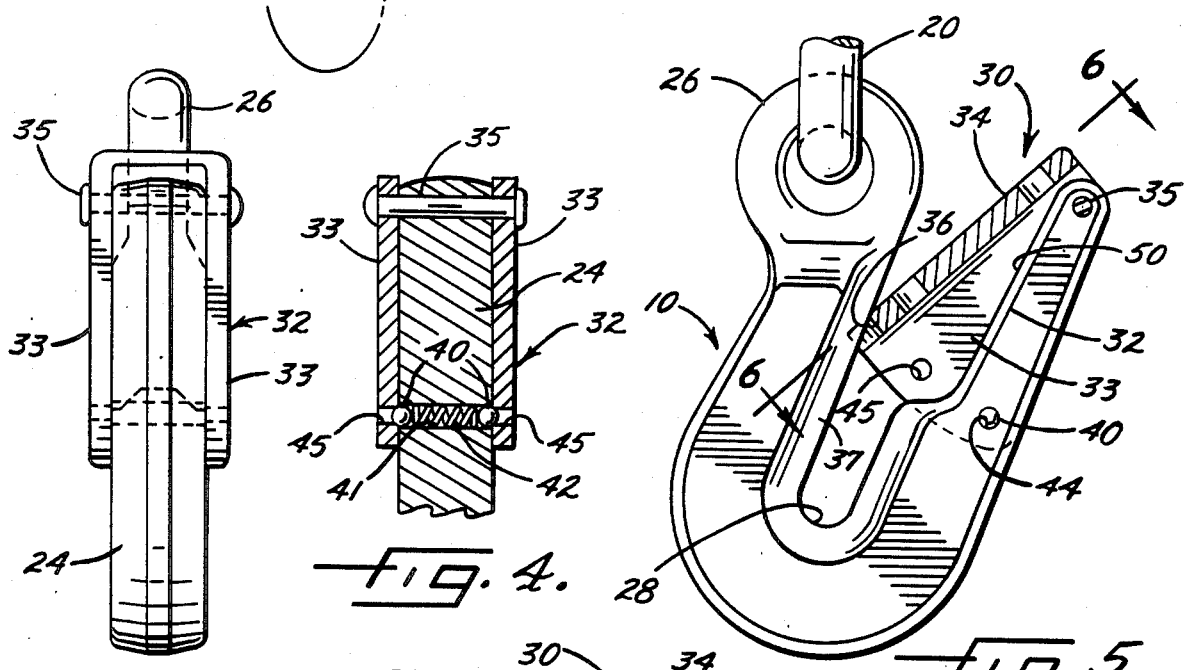
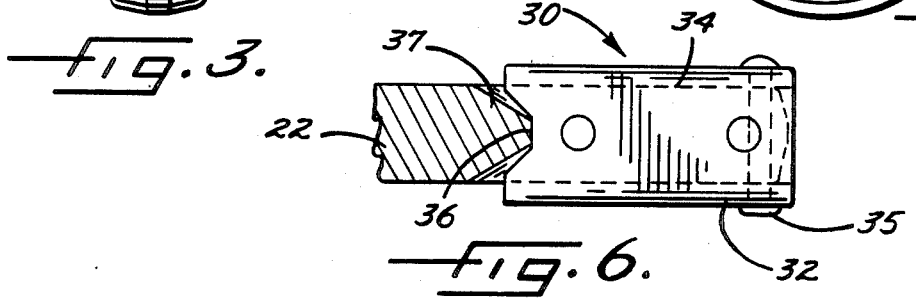

HOOK WITH SAFETY LATCH

BACKGROUND OF THE INVENTION

This invention relates generally to a hook and, more specifically, to a so-called grab hook for use with a chain sling to hold one end portion of the chain.

The invention particularly relates to a grab hook having a safety latch which, when in a latched position, retains the chain in the throat of the hook. When the latch is shifted to an unlatched position, the chain may be withdrawn from the hook.

SUMMARY OF THE INVENTION

The general aim of the present invention is to provide a grab hook having a new and improved safety latch which, when placed in either position, remains in that position until the latch is positively shifted to the other position.

A further object of the invention is to provide a grab hook having a novel safety latch which is selflocking in that any force imposed on the latch by the chain tends to lock the latch more tightly to protect against release of the latch.

A more detailed object is to achieve the foregoing by providing a latch which is uniquely located on the hook and which includes novel detent means for releasably holding the latch in either position.

The invention also resides in the relatively simple and inexpensive construction of the latch.

These and other objects and advantages of the invention will become more apparent from the following detailed description when taken in conjunction with the accompanying drawings.

BRIEF DESCRIPTION OF THE DRAWINGS

FIG. 1 is a front elevational view of a typical chain sling equipped with a new and improved hook and latch incorporating the unique features of the present invention.

FIG. 2 is an enlarged front elevational view of the hook and latch illustrated in FIG. 1, the latch being shown in an unlatched position.

FIG. 3 is a side elevational view as taken from the right of FIG. 2.

FIG. 4 is a fragmentary cross-section taken substantially along the line 4—4 of FIG. 2.

FIG. 5 is a view similar to FIG. 2 but shows the latch in cross-section and in a latched position.

FIG. 6 is a fragmentary cross-section taken substantially along the line 6—6 of FIG. 5.

DETAILED DESCRIPTION OF THE PREFERRED EMBODIMENT

For purposes of illustration, the invention is shown in the drawings as incorporated in a hook 10 and specifically in a grab hook for use with an elongated flexible element such as a chain 12 of a basket sling assembly 14. The sling assembly includes an oblong hoist link 16, a connecting link 18 and a master link 20. One end of the chain 12 is connected to the link 18 while the hook 10 is connected to the master link 20.

The hook 10 is a one-piece metal forging of generally U-shaped configuration and includes two legs 22 and 24. Formed on the upper end of the leg 22 is a laterally opening eye 26 which pivotally receives the master link 20. One link adjacent the free end portion of the chain 12 is adapted to be draped edgewise within the throat 28 between the two legs and is held therein by virtue of the two chain links on opposite sides of the link in the throat being at right angles thereto and engaging the sides of the legs. The chain thus may be formed into a loop and may coact with a similarly looped chain to form a double sling around a pallet or the like.

In accordance with the present invention, the hook 10 is equipped with a new and improved safety latch 30 which captivates the chain 12 against moving upwardly out of the hook. The latch is characterized by a latching member 32 which pivots between latched and unlatched positions and which remains in either position until positively moved to the other position. In addition, any upward force exerted on the latching member by the chain tends to clamp the latching member more tightly in its latched position and thus the latching member self-locks when under load.

More specifically, the latching member 32 is a one-piece sheet metal stamping having a generally U-shaped cross-section. Thus, the latching member includes two laterally spaced wings 33 having inner margins which are spanned laterally by an integral plate 34, the latter being substantially flat. Each wing is generally in the shape of an isosceles triangle.

In carrying out the invention, the latching member 32 is located with its wings 33 straddling the leg 24 of the hook 10 and with its plate 34 disposed adjacent the inboard side of the leg 24. Moreover, the latching member is mounted pivotally on the free end portion of the leg 24 to swing between latched and unlatched positions. For this purpose, a horizontal rivet 35 extends laterally through the upper end portions of the wings 33 and the upper free end portion of the leg 24 and supports the latching member to pivot between the positions shown in FIGS. 2 and 5.

When the latching member 32 is in its latched position shown in FIG. 5, the lower end of the plate 34 engages and is stopped by the inboard side of the leg 22 of the hook 10. As shown in FIG. 6, the lower end of the plate 34 is formed with a downwardly opening and substantially V-shaped notch 36 and, when the latching member is in its latched position, the notch receives and bears against a generally V-shaped rib 37 formed on the inboard side of the leg 22. As a result of the location of the pivot 35, any upward force exerted against the lower edges of the wings 33 by the chain 12 tends to swing the latching member clockwise about the pivot to force the bottom of the notch 36 into tighter engagement with the rib 37. Thus, it is virtually impossible for the latching member to be swung open by the chain.

Further in keeping with the invention, provision is made of novel detent means for holding the latching member 32 releasably both in its latched position and in its unlatched position. Herein, the detent means comprise a pair of spherical plungers or balls 40 (FIG. 4) located at opposite ends of a laterally extending hole 41 which is formed through the leg 24 adjacent the lower end portion of the latching member. A coil spring 42 is located within the hole between the balls and urges the balls outwardly toward the ends of the hole.

Detents on the latching member 32 coact with the balls 40 to hold the latching member releasably in either of its positions. In the present instance, the detents are defined by a first pair of openings 44 formed through the lower end portions of the wings 33 adjacent the outboard edges thereof and by a second pair of openings 45 (FIGS. 4 and 5) formed through the lower end portions of the wings and spaced angularly from the openings 44 about the axis of the rivet 35. Each opening is circular in shape and has a diameter slightly less than the diameter of the balls 40.

When the latching member 32 is in its unlatched position as shown in FIG. 2, the balls 40 are urged into and seat within the openings 45. Accordingly, the balls 40 and the openings 45 coact to hold the latching member releasably in its unlatched position. When the latching member is pivoted clockwise toward its latched position, the edges of the openings 45 cam against the balls 40 and push the balls inwardly against the force of the spring 42 to release the latching member for clockwise pivoting. As the latching member pivots to its latched position, the balls are captivated in the hole 41 by the inside faces of the wings 33. When the latching member reaches its latched position, the balls pop out into the openings 44 to hold the latching member in that position (see FIG. 5) until a substantial counterclockwise force is exerted on the latching member.

When the latching member 32 is in its unlatched position, the plate 34 of the latching member is substantially parallel to the inboard side of the leg 24 and is received within an elongated notch or relieved area 50 (FIG. 5) formed in the inboard side of the leg 24. As a result, the plate is spaced outwardly from the inboard side of the lower portion of the leg 24 and does not obstruct the throat 28 of the hook 10 or interfere with insertion or removal of the chain 12. When the latching member is in its latched position, the outboard edges of the triangular wings 33 are substantially flush with the outboard side of the leg 24 (see FIG. 5) and are incapable of snagging or being snagged.

I claim:

1. A safety hook comprising a generally U-shaped piece of metal having first and second legs, said second leg having a solid free end portion and having a second remaining portion located adjacent said free end portion, each of said legs having inboard and outboard sides and having a pair of laterally facing sides, an eye on the free end portion of said first leg, and a latch for retaining an element between said legs, said latch comprising a single-piece latching member of generally U-shaped cross-section and defined by two laterally spaced wings and by a plate having a free end portion and an inboard side, said plate being formed integrally with and extending laterally between said wings, said latching member being located with said wings straddling said second leg and with said plate disposed adjacent the inboard side of said second leg, the free end portion of said second leg including an elongated relief area which lies outwardly of the inboard side of the remaining portion of said second leg, means extending between said wings and the free end portion of said second leg and mounting said latching member for swinging toward and away from said first leg between latched and unlatched positions, the free end portion of said plate engaging and being stopped by the inboard side of said first leg when said latching member is in said latched position and being received within and engaging the elongated relief area of the inboard side of said second leg when said latching member is in said unlatched position so as to cause the inboard side of said plate to lie outwardly of the inboard side of the remaining portion of said second leg, a laterally extending hole formed through said second leg, two balls located in the two end portions of said hole, a spring located within said hole between said balls and urging the balls toward the ends of said hole, first and second angularly spaced openings formed in each of said wings adjacent the free end portion thereof, each of said openings having a diameter less than the diameter of said balls, said first openings receiving said balls when said latching member is in said latched position and coacting with said balls to releasably hold said latching member in said latched position, and said second openings receiving the same balls when said latching member is in said unlatched position and coacting with said balls to hold said latching member releasably in said unlatched position.

2. A safety hook as defined in claim 1 in which each wing is shaped generally as an isosceles triangle, the outboard edges of said wings being substantially flush with the outboard side of said second leg when said latching member is in said latched position.

3. A safety hook as defined in claim 1 in which the inboard side of said first leg is formed with a generally V-shaped rib, and a generally V-shaped notch formed in the free end of said plate and receiving said rib when said latching member is in said latched position.

* * * * *